Nov. 26, 1940. T. L. FAWICK Re. 21,630

REVERSE GEAR

Original Filed March 16, 1935 3 Sheets-Sheet 1

Inventor:
Thomas L. Fawick

By: Brown Jackson Boettcher & Dienner

Attys.

Nov. 26, 1940. T. L. FAWICK Re. 21,630

REVERSE GEAR

Original Filed March 16, 1935 3 Sheets-Sheet 2

REVERSE GEAR

Original Filed March 16, 1935 3 Sheets-Sheet 3

Inventor:
Thomas L. Fawick

By:
Brown, Jackson & Boettcher & Dienner

Attys.

Reissued Nov. 26, 1940

Re. 21,630

UNITED STATES PATENT OFFICE 21,630

REVERSE GEAR

Thomas L. Fawick, Akron, Ohio

Original No. 2,187,967, dated January 23, 1940, Serial No. 11,505, March 16, 1935. Application for reissue filed April 22, 1940, Serial No. 331,060

15 Claims. (Cl. 74—377)

The present invention relates generally to transmissions and is particularly concerned with the provision of a new and improved reversing gear for marine use.

The principal object of the present invention is the provision of a reversing gear having means not only providing for driving both forward and rearward but, in addition, serving as means for connecting and disconnecting the power, thereby replacing the usual main power clutch.

A further object of the present invention is the provision of clutch means adapted to be frictionally engaged, permitting limited slippage, in starting up under load and maneuvering, with associated means arranged after the load is moving for connecting the driving and driven parts together in a positive manner to be driven at a one-to-one ratio without any slippage as is usually desirable when starting.

A further object of the present invention is the provision in a clutch or transmission of this type of improved shifting mechanism operable to bring about, first, frictional engagement during starting and maneuvering and, second, positive one-to-one engagement without slipping, and a still further object of the present invention is to lock the shifting mechanism in such positive position after the starting and maneuvering have been completed.

More specifically, an additional object of the present invention is the provision of reversing gear for marine use and the like which embodies low angle conical driving clutch members, which are oppositely rotatable in connection with a shiftable companion clutch member cooperating therewith during initial engagement to transmit torque for starting and maneuvering, the driving and driven parts being subsequently connected for positive engagement, either by additional pressure on the clutches or by associated jaw clutch mechanism or the like. In this connection, it is a further object of the present invention to provide improved bearing means for supporting the driving and driven shafts, in such a manner that a short, compact and sturdy transmission is provided and in which the space required is a minimum. Still further, another object of the present invention is the provision of improved supporting means for a gear reduction associated with the transmission, the same principles being applicable to an overdrive if higher speed is required.

Another object of the present invention is the provision of a shiftable combination of friction and positively acting clutch means, with the friction clutches operable to transmit driving torque during starting and maneuvering and the positively acting clutch means serving to connect the driving and driven members together without slippage after the load is moving. In this connection, a further object of the present invention is the provision of new and improved synchronizing mechanism arranged to prevent the engagement of the positive drive unless or until the driving and driven parts are rotating together, and a still further object of the present invention is the provision of synchronizing mechanism making use of the friction clutches which, in the first instance, are adapted to transmit driving torque during starting and maneuvering, as aforesaid.

These and other objects and advantages of the present invention will be apparent to those skilled in the art after a consideration of the following detailed description of the preferred structural forms which are illustrated in the accompanying drawings forming a part of this specification.

Figure 1:
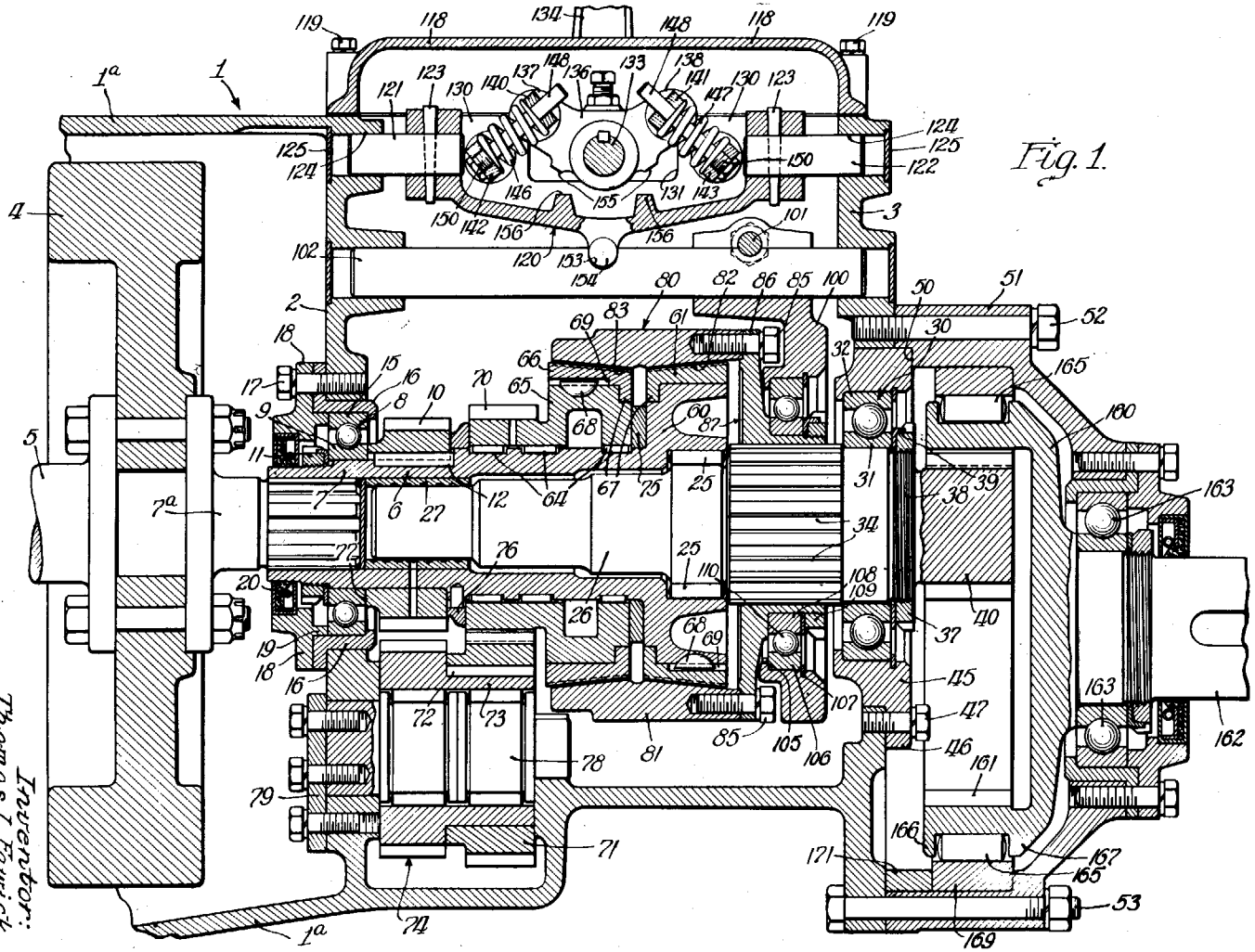
Figure 1 is a vertical longitudinal section taken through a transmission embodying the principles of the present invention.

Referring now to the drawings, and more particularly to Figure 1, the reference numeral 1 indicates the gear case or housing of the reversing gear or transmission, the gear case being provided with a forward wall 2 and a rear wall 3 having suitable openings therein to receive the supporting bearings and the shift rods and other parts. The forward portion of the case 1 may be formed, as at $1^a$, to receive the flywheel 4 of the engine or other source of power, if desired, the flywheel 4 being secured to the crank shaft 5 of the motor. The driving shaft of the transmission is indicated in its entirety by the reference numeral 6 and includes the tubular member having a splined internal section 7 at its forward end by which the driving shaft is directly connected to the motor, as by a short stub shaft section 1a, without the interposition of an engine clutch or the like. The drive shaft 6 of the transmission is journaled by suitable bearing means 8 in the front wall 2 of the gear case 1, and the bearing means 8 comprises an inner race 9 securely fixed to the tubular drive shaft 6 between a gear 10 and a threaded nut 11, the gear 10 being secured, as by a key 12, to the forward end of the drive shaft 6. The outer race of the bearing means 8 is indicated by the reference numeral 15 and is carried by a flanged collar 16 secured to the front wall 2 of the gear case by cap screws 17, which are also utilized in attaching a cap 18 to the gear case, the cap 18 having an internal flange 19 cooperating with the member 16 for retaining the outer race 15 in place. A conventional oil ring 20 is employed to seal the drive shaft in the casing to prevent loss of lubricant.

The rear end of the driving shaft 6 is supported by needle point bearings 25 on the driven shaft 26 adjacent its rear end. The driven shaft 26 is supported at its forward end and is disposed within the tubular driving shaft 6 by means of a bronze bushing 27 or other form of anti-friction means, such as a roller bearing, the anti-friction means 27 being disposed substantially in the planes of the gear 10 and the bearing means 8. The rear end of the driven shaft 26 is carried by suitable anti-friction means 30 including an inner race 31 and an outer race 32. The inner race is clamped against the rear ends of splines 34, the latter forming a splined section between the bearing means 25 and the bearing means 30. The inner race 31 is clamped against the ends of the splines 34 by a retainer ring 37 screwed onto a threaded portion 38 at the rear end of the driven shaft 26 and held by a lock washer 39 or the like. The driven shaft 26 terminates rearwardly in a pinion 40 which will be referred to later. The outer bearing race 32 is carried in a bearing retainer or support 45 having its lower half provided with a flange 46 receiving attaching cap screws 47, the upper portion of the bearing retainer 45 fitting in a recess 50 formed at the upper portion of an auxiliary housing 51 enclosing the pinion 40 and associated parts and which will be referred to later. It will be noted, however, that the auxiliary housing 51 is held in place by cap screws 52 and bolts 53, being attached to the rear wall 3 of the gear case or housing 1.

The rear end of the tubular driving shaft 6 carries a driving clutch member 60 disposed in the plane of the needle point bearings 25. The driving clutch member 60 carries a part 61 having a conical friction clutching surface, and journaled for rotation on the driving shaft 5, as by needle point bearings 64, is a reverse driving member 65 carrying on its outer portion a conical friction clutch member 66, the angularity of the latter being substantially equal but opposite to the angularity of the conical friction clutch member 61, as best shown in Figure 1. Both of the conical clutching portions 61 and 66 are preferably bronze or the like, and each has a radially inwardly extending flange 67 to take care of all axially directed thrusts. The conical members 61 and 66 are secured to the driving members 60 and 65, respectively, by any suitable means, such as keys 68 carried by said members and disposed in slots 69 formed in the driving members. The reverse driving member 65 also includes a pinion section 70 which is in constant mesh with a pinion 71 secured, as by a key 72, onto the hub portion 73 of a reverse gear 74, the latter being driven from the gear 10 on the driving shaft 6 by a reverse idler (not shown) of conventional construction. From Figure 1 it will be observed that the gear 10 is of the same diameter as the corresponding gear section of the reverse gear 74, and that the pinion 70 is of the same diameter as the pinion 71. Therefore, the reverse driving member 65 will be driven in a reverse direction at the same speed that the clutch member 60 is driven in a forward direction.

A bronze thrust washer 75 is disposed between the two driving members 60 and 65, and a similar thrust washer 76 is disposed between the forward end of the reverse driving member 65 and the rear end of the gear 10 on the driving shaft 5. As best shown in Figure 1, the forward portion of the gear 10 carries a flange 77 against which the inner race 9, referred to above, is secured by the clamping nut 11. The gear 10 thus serves as a fixed abutment for not only the inner race 9 but also the thrust bearing 76 and the associated reverse driving member 65. The thrust bearing 75 prevents rearward axial displacement of the reverse driving member 65. The driving member 60, being carried directly on the driving shaft 5, has been referred to as the forward driving member while the member 65, driven through reverse gears, has been referred to as the reverse driving member, but it will be understood that these terms are merely relative.

The reverse gear 73 is supported for rotation by needle point bearings on a shaft 78 held against rotation by a flange 79 bolted to the front wall 2.

Figure 6:
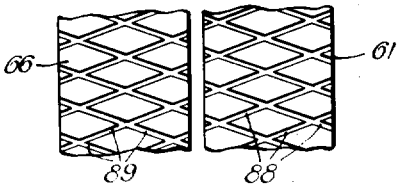
Figure 6 is a view showing the serrations formed on the conical clutch faces.

The driven clutch part, optionally engageable with either of the driving clutch parts 61 and 66, is indicated in its entirety by the reference numeral 80 and includes a double cone ring 81 having oppositely disposed conical clutch surfaces 82 and 83 engageable, respectively, with the conical clutch members 61 and 66. The double cone ring 81 is secured by cap screws 85 to the flange 86 of a shiftable member 87 movably mounted on the splined section 34 of the driven shaft. As is obvious, when the member 87 and the attached double cone clutch ring 81 are shifted rearwardly to the right in Figure 1, the surface 82 frictionally engages the conical surface on the clutch member 61, and when the parts 81 and 87 are shifted in the other direction the other friction clutch, including the conical surface 83 on the ring 81 and the driving clutch member 66, is engaged. Both of these cone clutches are of the low angle type and are capable of transmitting large forces when securely engaged. As best shown in Figure 6, the bronze driving clutch members 61 and 66 are provided with serrated conical faces 88 and 89 for the purpose of providing for the rapid flow of oil toward and away from the contacting surface when the clutches are being engaged and disengaged.

The shiftable driven member 80 is shifted from neutral (Figure 1) to either forward or reverse driving position by means of a shift yoke 100 clamped by bolt means 101 to a movable shift rod 102. The lower portion of the shift yoke 100 is provided with a shoulder 105, against which a bearing race 106 is held, as by a retainer ring 107, and the hub portion of the member 87 carries an inner race 108, retained in place by a nut member 109. Anti-friction balls 110 are disposed between the races 106 and 108 and operate in conjunction therewith to shift the member 80 axially along the splined section 34 of the driven shaft in response to movements of the shift rod 102.

Mounted in the upper portion of the gear case 1 is a novel form of shifting means interconnected, as will be described below, with the shiftable driven member 80 in such a way that the initial movement of the member 80 in either direction under the control of the operator will engage one of the friction clutches so as to transmit torque to the driven shaft for purposes of starting the craft and maneuvering the same, the novel shifting mechanism also being then adapted to exert an increased force and to be locked in a position so as to firmly engage one or the other of the friction clutches, depending upon which way the member 80 is moved, so as to transmit the torque positively and directly from the driving to the driven parts without slippage.

The mechanism for shifting the rod 102 from one position to another is housed within a cover plate 118 secured to the case 1 by cap screws 119 and includes a toggle casting 120 having supporting stub shafts 121 and 122 secured thereto, as by taper pins 123, and shiftably mounted in recesses 124 formed in the front and rear walls 2 and 3 of the gear case and closed to prevent loss of lubricant by plates 125. The casting 120 includes laterally spaced side wall portions 130 having notches 131 formed therein to accommodate a transversely disposed shifting and locking shaft 133 on the outer end of which a shift lever 134 or the like is secured. Between the side wall portions 130 the shaft 133 carries keyed thereto a double-ended member 136 having oppositely disposed arms 137 and 138 provided with recesses to receive the swivel studs 140 and 141. Similar swivel studs 142 and 143 are supported in the side wall portions 130 of the casting 120, and compression springs 146 and 147 are disposed between the respective pairs of swivel studs, each spring embracing a toggle rod 148 passing through an aperture in the upper swivel stud and threaded, as at 150, into the lower swivel stud. The shift rod 102 is provided with a central notch 153 in which an operating lug 154 carried by the casting member 120 is disposed, so that when the casting member is shifted in either direction the shift rod 102 is moved in that direction, carrying with it the shift fork 100 and the shiftable driven member 80.

The operation of the mechanism described above is substantially as follows. The shift lever 134 is rocked in one direction to engage forward drive and in the other direction to engage reverse drive. In the embodiment illustrated, when the lever 134 is swung counter-clockwise the shiftable clutch member 80 is moved to the left and forces the conical clutching surface 83 into driving engagement with the companion friction clutch member 66 carried on the reverse driving member 65. The shifting of the parts, due to the counter-clockwise movement of the lever 134, is brought about as follows. When the lever 134 is moved away from its neutral position, counter-clockwise as viewed in Figure 1, the spring 146 is compressed to an extent, depending upon the amount the lever 134 has been moved and the toggle rod 148 extends or is swung downwardly. The compression on the spring 146 establishes a horizontal component tending to shift the casting member 120 to the left, and this, as will be obvious, moves the clutching conical surface 83 into driving engagement with the conical clutch member 66 with sufficient force that driving torque is transmitted from the driving shaft 5 through the member 65 and the member 80 to the driven shaft 26 for starting and maneuvering the craft. Limited slippage is provided for, to accommodate starting but the amount of slippage is dependent upon the extent of swinging of the gear shift lever 134, the more the latter is swung to the left the greater will be the compression of the spring 146 and the greater will be the force with which the conical cooperating parts are held together, and the harder they are forced together the less will be the slippage. After the craft is under way, the movement of the gear shift lever 134 to the left can be completed, and when this is done the swivel stud 140 is swung with its standard just below the line joining the centers of the shaft 133 and the swivel stud 142. This marks the maximum compression of the spring 146 and the parts are so arranged that this is sufficient to hold the members together so that they rotate as one without any slippage under maximum loads. To prevent the lever 134 from swinging too far in either direction, the lower portion of the double-ended lever 136 is provided with abutment projections 155 which cooperate, respectively, with lugs 156 carried by the lower wall of the casting member 120. When in abutment these lugs hold the parts in locked relation.

The movement of the shiftable clutch member 80 in the opposite direction, that is, to the right as viewed in Figure 1, is brought about by a clockwise movement of the shift lever 134, which compresses the other spring 147. The initial compression of this member causes the clutching surfaces 61 and 82 to engage for transmitting the torque for starting and maneuvering, but when the lever 134 is swung until its stop lugs 149 and 150 are in engagement the spring 147 experiences its maximum compression and the clutch parts 61 and 82 are held together to rotate as one without any slippage, even under maximum loads. The serrated faces on the clutch members 61 and 66, the low angle of their conical faces and the relatively large diameters of these parts provide means capable of transmitting relatively great amounts of power, and the bearing supports 7 and 27 for the forward ends of the tubular shaft and the driven shaft 26, over which the tubular shaft 5 is disposed, and the bearing means 25 and 30 for the rear ends of the shafts provide a sturdy support for the transmission parts capable of transmitting such amounts of power.

In some types of marine work it may be desirable to provide reduction gearing mechanism for the above described reverse gear, and to this end I propose to mount within the auxiliary housing 51 an internal gear member 160 having internal teeth 161 and a shaft section 162 supported by anti-friction bearing means 163 in the rear portion of the auxiliary housing 51, and according to the principles of the present invention the internal gear member 160 is provided with exterior anti-friction bearing means 165, being in the form of rollers disposed between flanges 166 and 167 formed on the outer peripheral portion of the internal gear 160 and operating against an outer race 168 carried by the housing 51. For this latter purpose, the housing 151 is provided with a ring member 171 extending only part way around the lower anterior portion of the housing 51 and clamped against the outer race 168 when the bolt means 52 and 53 are tightened to secure the housing 51 to the gear case. Preferably, the internal gear teeth 161, meshing with the teeth on the pinion 40, and the teeth on the latter are helical so that the unit will be practically noiseless, and the same is true of the gears effecting the reverse drive of the member 65. The bearing means 163 is arranged to take the axial thrusts to which the internal gear member 160 is subjected, and the bearing means 8 and 30 are arranged to take the axial thrusts to which the driving and driven shafts are respectively subjected. Thus, by virtue of this construction, a very compact and sturdy transmission is provided. A conventional oil seal 164 is arranged to prevent loss of lubricant from the rear end of the auxiliary housing 51.

Figure 2:
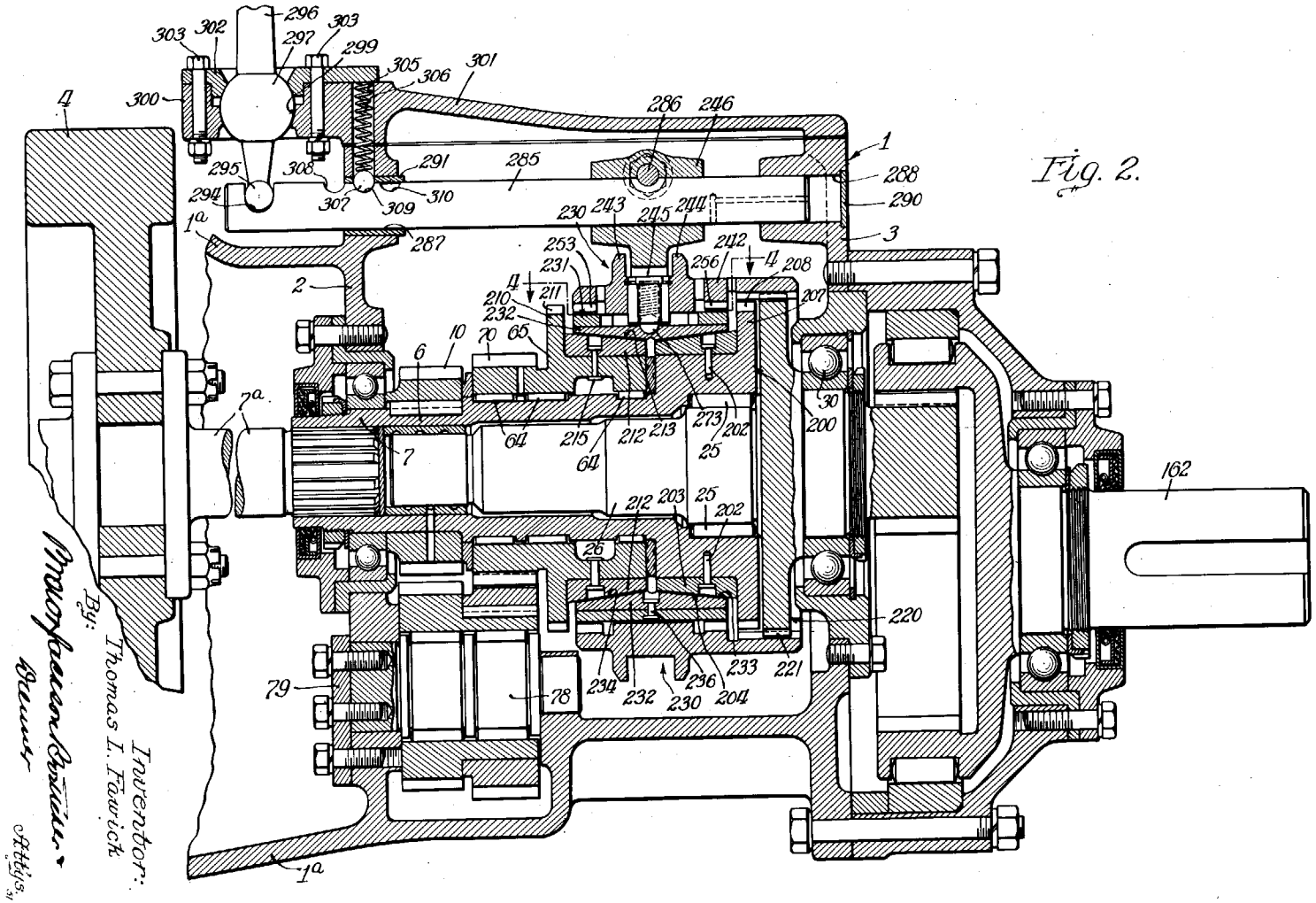
Figure 2 is a similar sectional view showing a modified form of the present invention.

In some cases, as where excessive amounts of power are required to be transmitted, some form of positive engagement means, cooperating with starting and maneuvering friction clutches, is a desirable provision, and in the form of the present invention shown in Figure 2 I have shown a construction embodying friction clutches for starting and maneuvering the craft and associated positive or jaw clutch means arranged to be engaged when the driving and driven shafts begin to rotate in synchronism or at a one-to-one ratio.

Referring now more particularly to Figure 2, in which it will be observed that many of the parts are of substantially the same form and construction as described above in connection with Figure 1, and hence the same reference numerals have been applied to similar parts. In the construction shown in Figure 2, the driving shaft and the driven shafts are of practically the same construction as described above, except that where the driven shaft 26 in Figure 1 carries a relatively long splined section 34, the driven shaft 26 shown in Figure 2 is provided with a radially extending flange provided with teeth serving as splines, although they are shorter than the splines shown in Figure 1, as will be described latter.

The tubular drive shaft 6 is supported in practically the same manner as described above and, in the plane of the needle point bearings 25 is provided with a driving clutch member 200 to which is secured, as by rivets 202, a friction clutch member 203 having a conical outer clutching surface 204. The rear end of the drive shaft 6 is provided with a flange 207 having exterior teeth 208 serving as the driving part of a positive or jaw clutch. The reverse member 65 in the construction shown in Figure 2 is also provided with a positive clutch member in the form of a flange 210 carried by or forming an integral part of the reverse driving member 65 and provided with external teeth 211. The driving reverse member 65 also carries a friction clutch member 212 having an exterior conical clutching surface 213 and secured to the member 65 by rivets 215 or the like. Preferably, the friction clutch members 203 and 212 are formed of the same material as described above and may, if desired, have the surfaces 204 and 213 serrated in the manner shown in Figure 6.

The driven shaft 26 in the form of the construction shown in Figure 2 is, like that shown in Figure 1, provided with a splined section disposed between the needle point bearings 28 which carry the rear end of the driving shaft 6 and the bearings 30 which support the rear end of the driven shaft 26, but in Figure 2 the splined portion takes the form of a radially outwardly extending flange 220 having a series of external teeth 221 which for all practical purposes serve the same purpose as the spline teeth 34 described above, namely, to maintain a constant but slidable connection between the driven clutch parts and the driven shaft.

Figure 3:
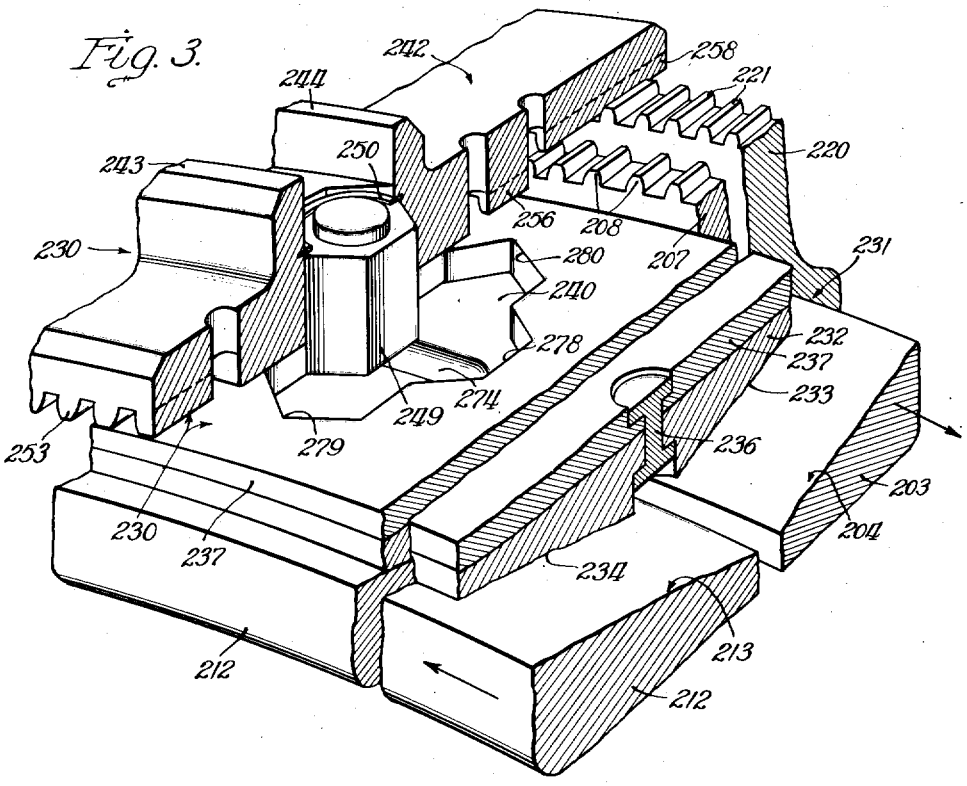
Figure 3 is a perspective view, with certain parts being shown in section, illustrating the arrangement of the synchronizing means employed in the transmission shown in Figure 2.

The shiftable member which serves to connect either of the driving clutches with the driven shaft takes the form of a two-part member indicated in its entirety by the reference numeral 230. The part 231 of the shiftable clutch member 230 includes a double cone member 232 having surfaces 233 and 234 engageable, respectively, with the clutch members 203 and 212, and secured, as by rivets 236, to the double cone member 232 is a synchronizing ring 237 which forms a rigid part of the member 231 and is provided with a plurality of recesses 240 which will be referred to later. The other part of the shiftable clutch member 230 is indicated by the reference numeral 242 and includes a sleeve and cylindrical member having a pair of radially outwardly extending flanges 243 and 244 between which the arms 245 of shift yoke 246 are adapted to be disposed. The member 242 carries a plurality of studs, of hexagonal formation, as indicated in Figure 3, and securely held in place therein in any suitable manner, as by rings 250. The studs 249 have radially inner ends disposed within the recesses 240 of the synchronizing ring 237. The forward portion of the shiftable clutch part 242 carries a plurality of clutch teeth 253 adapted to engage the clutch teeth 211 formed on the reverse drive member 65 in this form of the invention, and the rear portion of the shiftable clutch part 242 carries a plurality of teeth 256 which are engageable with the teeth 208 formed on the spline flange 207. The rearmost end of the member 242 carries a plurality of internal teeth 258 which are of sufficient length to remain in driving engagement with the teeth 221 formed on the spline flange 220 so that the clutch part 242 rotates at all times with the driven shaft 26, whether in neutral or reverse or forward position. Suitable anti-friction bearing means (not shown) may be disposed between the shift yoke 246 and the flanges 243 and 244.

The two parts 231 and 242 of the shiftable member 230 are movable with respect to each other, but spring pressed detent means is provided for causing the two parts to move together. Such detent means is indicated in its entirety by the reference numeral 270 and is disposed in one of the driving studs 249. Each of the detent means 270 includes a spring 271 disposed in a recess 272 in the associated stud 249 and pressing against a steel ball 273 which is disposed in a short groove 274 formed in the outer surface of the double cone clutch member 232. As best shown in Figure 3, the groove 274 is elongated so that the two parts 231 and 242 of the clutch member 230 may rotate relative to one another through a small angle without resistance but, up to the limit of resistance offered by the spring pressed ball 273, when the outer clutch member 242 is shifted the inner clutch member 231 moves with it.

Figure 4:
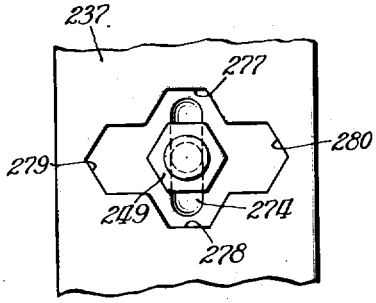
Figure 4 is a section taken along the line 4—4 of Figure 2.

The synchronizing ring 237 has the specially formed openings 240 and, as best shown in Figures 3 and 4, these openings are of approximately cruciform proportions and are provided with generally semi-hexagonal intermediate recesses 277 and 278 and laterally disposed recesses 279 and 280 of similar form but somewhat deeper. The associated stud 249 is adapted to be disposed in any one of these recesses in the operation of the transmission, as will be explained below.

The shift yoke 246 is mounted in any suitable means upon the slidable shift rod 285, preferably being securely clamped thereto by a clamping bolt 286, and the rod 285 is slidably disposed in suitably formed openings 287 and 288 in the front and rear walls 2 and 3 of the transmission case. The rear opening 288 is made tight by a plate 289 in the outer end thereof, and the forward opening 287 is provided with a bushing 291 through which the forward end of the shift rod 285 extends to a point outside the gear case. This end of the rod 285 is provided with a notch 294 which receives the lower end 295 of the gear shift lever 296 which has a ball 297 formed therein and adapted to be rockably disposed in a socket 299 formed in the forward end 300 of the gear case cover 301. A plate 302 is secured to the end 300, as by bolts 303, for the purpose of holding the gear shift lever 296 in place. Also, the forward end of the cover 301 is provided with a bore 305 which receives a spring 306 that is held in place by the retaining plate 302 and presses downwardly against a detent 307. The shift rod 285 is provided with three recesses or grooves 308, 309 and 310, and a hole in the bushing 291 permits the ball 307 to engage in any of these grooves for the purpose of easily retaining the shift rod 285 in either a neutral, forward or reverse position, the groove 308 defining the forward position, that is, when the craft is driven forwardly, and the groove 310 defines the reverse position.

The operation of the modification shown in Figure 2, having particular reference to the synchronizing mechanism by which the positive clutch means are not engaged until the friction clutch means has started the craft and brought the same up to the speed desired, is as follows. Assuming that it is desired to move forward, the gear shift lever 296 is swung forwardly in a counter-clockwise direction as viewed in Figure 2. This will exert a rearward thrust of the shift rod 285, forcing the ball 307 upwardly against the tension of the spring 306. The initial movement of the gear shift lever 296 and the shift rod 285 in the direction indicated first shifts the clutch part 242 rearwardly a slight amount, carrying with it, due to the action of the spring pressed ball 273 and its bearing against the sides of the groove 274, the double cone clutch part 231. This causes the conical portion 233 thereof to engage the surface 204 on the driving conical clutch member 203, and as soon as this engagement is effected the rotation of the driving member 200, shown by the arrow in Figure 3, drags with it the clutch part 231 until the lug 249, carried by the part 242, is engaged by the recess 277 in the synchronizing ring 237. Since the synchronizing ring 237 is riveted to the double cone member 232 it forms an integral part thereof, and hence the continued rotation of the driving member 200 thus rotates not only the clutch part 231 but also the clutch part 242, and since the latter is continually in engagement with the splined portion 220 of the driven shaft 26 the latter is thus driven by the frictional engagement of the clutching surfaces 204 and 233. These clutching surfaces are conical and have a relatively low angle of inclination so that by applying only moderate pressure against the shaft lever 296 these surfaces can be forced together with sufficient pressure to start the craft and maneuver the same in getting the craft under way. As is obvious, the greater the force applied to press the clutching surfaces 204 and 233 together the greater will be the amount of torque or force that can be transmitted by this friction means. This force is limited, however, by the resistance offered by the spring 271. However, when engagement is actually effected the rotation of the gear part 231 carries the notch 277, under the directions of shift assumed above, into embracing engagement with the lug 249. As soon as this is accomplished any further shifting movement of the part 242 acts through the engagement of the lug 249 in the recess 277 and the transmission of starting and maneuvering torque therethrough to carry laterally with it the inner shiftable clutch part 231. Thus, more force can be exerted on the gear shift lever to press the clutching surfaces together than would be possible if merely the spring pressed ball were relied upon to press the clutching parts together.

Figure 5:
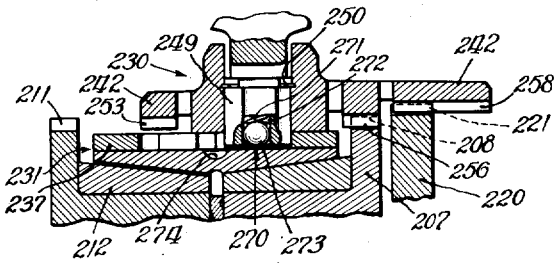
Figure 5 is a fragmentary sectional view showing the positions of the parts after the positive clutch means has been engaged.

The engagement of the recess 277 around the lug or stud 249 has a further purpose, namely, it serves under these conditions to absolutely prevent any movement of the member 242 sufficient to carry the teeth 256 into engagement with the clutch member 207. This causes all the torsion exerted by the source of power transmitted to the driven shaft to be transmitted thereto through only the friction clutch means. That is, as long as the lug 249 is in the recess 277 it cannot be shifted into the lateral recess 280, but when the craft gets under way and starting and any necessary maneuvering has been effected, it is then desirable to bring the positive clutches in operation in order to prevent any possible slippage by the transmission of all of the power through the gripping friction surfaces. In the construction illustrated, all that is necessary to do to make it possible to engage the positive clutch means is to bring the driving and driven parts into synchronism so that the momentum of the craft will be enabled to rotate the member 242 relative to the drawing part 231 just sufficient to bring the lug 249 out of the recess 277 and into the central portion of the opening 240, and as soon as this occurs then additional pressure on the gear shift lever will move the clutch part 242 rearwardly, bringing the lug 249 into engagement with the recess 280 and, at the same time, bringing the positive clutch teeth 256 into engagement with teeth 208 on the driving member 200. Pressure on the gear shift lever, acting through the hexagonal lug 249 and angular edges of the recess 277 also makes it possible to shift the part 242 out of position shown in Figure 3 to the position shown in Figure 5. It is to be noted that the friction clutches are held in engagement by the pressure of the ball 273 against the walls of the groove 274 until after the toothed or positive clutches start to engage. Since the member 242 is always in engagement with the splined flanges 220, the final shifting movement of the clutch member 242 thus positively secures the driving and driven shafts in direct engagement (Figure 5) so that the torque is no longer transmitted through the friction clutches or the friction clutch elements. The ring member 237 and associated parts, including the lugs 249 on the member 242, thus serve as synchronizing means acting to prevent any engagement of the positive clutch parts until the driven shaft has been brought up to the speed desired and rotates in synchronism with the driving shaft 6 so as to make it possible to complete the shifting movement of the movable clutch part 242 to bring the lug 249 into the lateral recess 280.

The operation of the mechanism in selecting reverse drive is substantially the same, the gear shift lever 296 being swung in a clockwise direction, as viewed in Figure 2, to move the shiftable parts forwardly of the gear case, rather than rearwardly as described above. Otherwise, the operation is substantially the same, the synchronizing mechanism serving to prevent any engagement between the positive clutch parts 211 and 233 until the friction clutches serve their purpose in getting the craft under way so that as soon as the parts rotate at substantially the same speed, the member 242 can be shifted to its positively engaged position in the gear case to bring the teeth 253 into mesh with the teeth 211 on the reverse driving member 65. The friction clutch elements are, however, positively held in engagement by the ball 273 engaging one side of the groove 274 until the teeth 211 and 253 are engaged, but after their engagement is complete the ball 273 is forced out of the groove 274 and no longer exerts any force against the friction clutch part 231, the entire driving torque being taken by the positive toothed clutch parts.

As will be apparent from Figure 3, in selecting and effecting reverse drive, it is the intermediate recess 278 that engages the driving stud 249, and it is the recess 279 which finally receives the stud after synchronism has been effected.

While I have shown and described above the preferred forms of my invention, it will be apparent to those skilled in the art that the present invention is not to be limited to the particular details shown and described above, but that, in fact, widely different means may be employed in the practice of the broader aspects of my invention.

What I claim, therefore, and desire to secure by Letters Patent is:

1. A transmission comprising a gear case, a tubular driving shaft mounted for rotation in said gear case, bearing means for the forward end of said tubular driving shaft, a driven shaft also mounted for rotation in said gear case, bearing means supporting the rear end of said driven shaft therein, the forward end of said driven shaft being disposed within and adjacent the forward end of said tubular driving shaft, bearing means supporting the forward end of said driven shaft in said tubular drive shaft, said bearing means being disposed adjacent the bearing means for the forward end of the latter, bearing means adjacent the rear end of said driven shaft for supporting the rear end of said tubular drive shaft thereon, the portion of said driven shaft between said last named bearing means and the bearing means for the rear end of the driven shaft being splined, a driving member carried by said driving shaft, a second driving member mounted for rotation on said tubular drive shaft and driven therefrom differently than said first driving member, a shiftable member operatively connected with said splined section and movable from one position to another frictionally to engage either of said driving members, and thrust bearing means adjacent the bearing means that supports the rear end of the tubular driving shaft and cooperating with said second driving member and said tubular driving shaft to prevent the thrust of said shiftable member against said second driving member from moving the same away from said first driving member.

2. In a transmission, a gear case, a driven shaft mounted for rotation therein and including a driven pinion extending rearwardly from the gear case, bearing means carried in the rear wall of said case for supporting said driven shaft, an auxiliary housing secured to said gear case and enclosing said pinion, a final driven shaft mounted for rotation in said auxiliary housing, an internal gear member connected with said final driven shaft and meshing with said pinion, and anti-friction means disposed between the outer peripheral portion of said internal gear member and said auxiliary housing.

3. In a transmission, a gear case, a driven shaft mounted for rotation therein and including a driven pinion extending rearwardly from the gear case, bearing means carried in the rear wall of said case for supporting said driven shaft, and auxiliary housing secured to said gear case and enclosing said pinion, a final driven shaft mounted for rotation in said auxiliary housing, an internal gear member connected with said final driven shaft and meshing with said pinion, anti-friction means disposed between the outer peripheral portion of said internal gear member and said auxiliary housing, said last named bearing means being capable of taking radially directed loads only, and anti-friction bearing means arranged to take both axial and radial loads for supporting said final driven shaft in said auxiliary housing.

4. In a reverse gear, a gear case, driving and driven shafts journaled for rotation therein, bearing means for the front end of said driving shaft, reversing gearing mounted adjacent said front bearing and including a part journaled for rotation on said driving shaft, means shiftable on said driven shaft and adapted to connect with either said driving shaft or said reversing gearing, a pinion carried at the rear end of the driven shaft, a final driven member including an internal gear meshing with said pinion, flanges formed on the peripheral portion of said internal gear member, and a plurality of anti-friction rollers disposed between said flanges and carried by said gear case to support said internal gear for rotation.

5. In a reverse gear, the combination of a source of power, a driving shaft directly connected therewith, a lay shaft geared to said driving shaft, a tubular reverse driving member geared to said lay shaft, said driving shaft extending coaxially through said tubular reverse driving member, a direct driving member fixed on the extending end of said driving shaft in proximity to said tubular reverse driving member, an intermediate driven shaft, a driven member splined to said intermediate driven shaft and optionally engageable with said tubular reverse driving member and said direct driving member, a pinion on said intermediate driven shaft, a driven shaft, an internal gear on said driven shaft meshing with the pinion on said intermediate driven shaft, and a bearing for said internal gear and disposed outside said gear and in radial alignment with the toothed engagement between said gear and the pinion on the intermediate driven shaft.

6. In a reverse gear, the combination of a source of power, a driving shaft directly connected therewith, a lay shaft geared to said driving shaft, a tubular reverse driving member geared to said lay shaft, said driving shaft extending coaxially through said tubular reverse driving member, a direct driving member fixed on the extending end of said driving shaft in proximity to said tubular reverse driving member, a driven shaft, a radially extending part on said driven shaft, clutch teeth on the periphery of said part, clutch teeth on said tubular reverse driving member, clutch teeth on said direct driving member, a clutching member having clutch teeth in permanent engagement with the clutch teeth on the radially extending part on said driven shaft and clutch teeth shiftable into engagement selectively with the clutch teeth on the respective driving members, and means inclusive of friction clutch means serving to connect the driving and driven shafts for limited slippage to transmit torque therebetween.

7. In a reverse gear, the combination of a source of power, a driving shaft directly connected therewith, a lay shaft geared to said driving shaft, a tubular reverse driving member geared to said lay shaft, said driving shaft extending coaxially through said tubular reverse driving member, a direct driving member fixed on the extending end of said driving shaft in proximity to said tubular reverse driving member, an intermediate driven shaft, a radially extending part on said intermediate driven shaft, clutch teeth on the periphery of said part, clutch teeth on said tubular reverse driving member, clutch teeth on said direct driving member, a clutching member having clutch teeth in permanent engagement with the clutch teeth on the radially extending part on said intermediate driven shaft and clutch teeth shiftable into engagement selectively with the clutch teeth on the respective driving members, means inclusive of friction clutch means serving to connect the driving and driven shafts for limited slippage to transmit torque therebetween for starting and maneuvering, a pinion on said intermediate driven shaft, a driven shaft, and an internal gear on the last said driven shaft meshing with the pinion on said intermediate driven shaft.

8. A reverse gear comprising a casing, a driving shaft journaled for rotation therein and adapted to be connected to a source of power, a tubular reverse driving member mounted for rotation on said driving shaft adjacent one end thereof, gearing driven from said driving shaft for driving said reverse driving member at substantially the same speed as but in the opposite direction from said driving shaft, a pair of friction clutch elements, one fixed to said one end of the driving shaft and the other fixed to the adjacent end of said tubular reverse driving member, a driven shaft supported for rotation in said casing and held against axial movement therein, a companion friction clutch element carried in driving relation with said driven shaft and movable axially relative thereto, said pair of friction clutch elements having low angle friction surfaces and the companion clutch element embracing said pair of clutch elements and having two friction clutch surfaces on the inside disposed at a low angle corresponding to the angle of said pair of friction clutch elements, the angle of said friction elements being sufficiently low that adequate power is transmitted for starting and driving the craft through said friction elements optionally in either direction, and means for shifting said companion friction clutch element relative to said driven shaft and said pair of clutch elements to start and drive the craft in the selected direction.

9. In a reverse gear, the combination of a source of power, a tubular driving shaft connected therewith, a lay shaft geared to said driving shaft, a tubular reverse driving member geared to said lay shaft and driven thereby in the opposite direction from but at the same speed as said driving shaft, said driving shaft extending coaxially through said tubular reverse driving member, a direct driving member fixed on the extending end of said driving shaft in proximity to said tubular reverse driving member, a driven shaft extending coaxially through said tubular driving shaft and supported at its inner end by the forward portion of the driving shaft, the rear end of said driven shaft supporting the rear end of said tubular driving shaft, an axially shiftable driven member splined to said driven shaft and optionally engageable frictionally with said tubular reverse driving member and said direct driving member for driving the craft in either direction, and thrust bearing means between said tubular reverse driving member and said tubular driving shaft for preventing relative axial movement therebetween in either direction.

10. A reverse gear comprising a tubular driving shaft, a casing supporting said driving shaft and having bearing means receiving said driving shaft and preventing axial movement thereof relative to the casing, a tubular reverse driving member mounted for rotation on said driving shaft, means driven from said driving shaft for driving said tubular reverse driving member in the opposite direction, said driving shaft extending coaxially through said tubular reverse driving member, a direct driving member fixed on the extending end of said driving shaft in proximity to the tubular reverse driving member, a driven shaft extending coaxially through the tubular driving shaft, bearing means supporting the inner end thereof in said tubular driving shaft adjacent said first bearing means, bearing means supporting the outer end of said driven shaft in said casing, said last named bearing means preventing axial movement of the driven shaft relative thereto, a driven member splined to said driven shaft, low angle cone clutch means on said driven member, said direct driving member and the tubular reverse driving member, whereby movement of said driven member into engagement with one or the other of said driving members serves to drive the craft in either direction, thrust bearings at opposite ends of said tubular reverse driving member and acting against said tubular driving shaft for preventing axial displacement of the reverse driving member relative to said driving shaft, and means for shifting said splined driven member, axial thrust due to the engagement of said low angle clutch means being taken by said first mentioned bearing means and axial thrust due to the movement of the splined member relative to the driven shaft being taken by the bearing means supporting the outer end of the latter.

11. The combination of a source of power and reverse gear comprising a driving shaft connected with said source of power, a driven shaft, means providing forward and reverse gearing including friction clutch means for starting in either forward or reverse, and positive clutch means arranged to connect said driving and driven shafts after driving has begun in the selected direction, said reverse gearing comprising two telescoped transmission shafts, two clutch structures mounted upon the telescoped shafts respectively and each including friction clutch means and positive clutch means, a mating clutch structure including mating members for the two friction clutch means and for the two positive clutch means, an actuating member, and mechanical means so connecting the said actuating member to said mating members that it is common to all of them.

12. A reverse-gear transmission comprising a driving shaft, a driven shaft, and forward and reverse driving means interposed operatively between the two, said means comprising coaxial forward and reverse shafts one within the other, gearing connecting the forward and reverse shafts and compelling them to rotate in opposite directions, juxtaposed friction clutch members on the said coaxial shafts respectively and a positive clutch member on at least one of them, and mating clutch members on one of the two first-mentioned shafts and adapted to be engaged selectively with the said friction clutch members and the said positive clutch member.

13. A reverse-gear transmission for driving a marine propeller, said transmission comprising a driving shaft, a marine propeller shaft, and forward and reverse driving means interposed operatively between the two, said means comprising coaxial forward and reverse drive members one within the other, gearing connecting the said members and compelling them to rotate in opposite directions, juxtaposed, friction clutch members on said coaxial members respectively and a positive clutch member on at least one of them, and mating clutch members having drive relation to one of the said shafts and adapted to be engaged selectively with the said friction clutch members and the said positive clutch member.

14. A reverse-gear transmission comprising a driving shaft, a driven shaft, and forward and reverse driving means interposed operatively between the two, said means comprising coaxial forward and reverse shafts one within the other, gearing connecting the forward and reverse shafts and compelling them to rotate in opposite directions, juxtaposed friction clutch members on the said coaxial shafts respectively and oppositely tapered and a positive clutch member on at least one of them, and mating clutch members on one of the two first-mentioned shafts and adapted to be engaged selectively with the said friction clutch members and the said positive clutch member.

15. A reverse-gear transmission comprising a driving shaft, a driven shaft, and forward and reverse driving means interposed operatively between the two, said means comprising coaxial forward and reverse shafts one within the other, gearing connecting the forward and reverse shafts and compelling them to rotate in opposite directions, juxtaposed friction clutch members on the said coaxial shafts respectively and a positive clutch member on at least one of them, and mating clutch members on one of the two first-mentioned shafts and adapted to be engaged selectively with the said friction clutch members and the said positive clutch member, an actuating member, and mechanical means so connecting said actuating member to said mating members that it is common to all of them.

THOMAS L. FAWICK.